US010455254B2

(12) United States Patent
Huang et al.

(10) Patent No.: US 10,455,254 B2
(45) Date of Patent: Oct. 22, 2019

(54) METHOD AND APPARATUS OF VIDEO CODING

(71) Applicant: MEDIATEK INC., Hsinchu (TW)

(72) Inventors: Han Huang, San Jose, CA (US); Shan Liu, San Jose, CA (US); Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/806,632

(22) Filed: Nov. 8, 2017

(65) Prior Publication Data

US 2018/0131969 A1    May 10, 2018

Related U.S. Application Data

(60) Provisional application No. 62/419,989, filed on Nov. 10, 2016.

(51) Int. Cl.
| | |
|---|---|
| *H04N 19/117* | (2014.01) |
| *H04N 19/167* | (2014.01) |
| *H04N 19/159* | (2014.01) |
| *H04N 19/86* | (2014.01) |
| *H04N 19/105* | (2014.01) |
| *H04N 19/176* | (2014.01) |
| *H04N 19/196* | (2014.01) |
| *H04N 19/137* | (2014.01) |
| *H04N 19/82* | (2014.01) |

(52) U.S. Cl.
CPC ......... *H04N 19/865* (2014.11); *H04N 19/105* (2014.11); *H04N 19/117* (2014.11); *H04N 19/137* (2014.11); *H04N 19/159* (2014.11); *H04N 19/167* (2014.11); *H04N 19/176* (2014.11); *H04N 19/196* (2014.11); *H04N 19/82* (2014.11)

(58) Field of Classification Search
CPC ........................... H04N 19/865; H04N 19/105
See application file for complete search history.

(56) References Cited

U.S. PATENT DOCUMENTS

| | | | | |
|---|---|---|---|---|
| 8,369,419 B2* | 2/2013 | Hussain | ................. | H04N 19/86 |
| | | | | 375/240.12 |
| 8,848,801 B2* | 9/2014 | Lainema | .............. | H04N 19/159 |
| | | | | 375/240.24 |
| 8,913,670 B2* | 12/2014 | Mak-Fan | ............. | H04N 19/176 |
| | | | | 375/240.29 |
| 9,055,299 B2* | 6/2015 | Min | ..................... | H04N 19/139 |

(Continued)

*Primary Examiner* — Jayanti K Patel
*Assistant Examiner* — Irfan Habib
(74) *Attorney, Agent, or Firm* — Oblon, McClelland, Maier & Neustadt, L.L.P.

(57) ABSTRACT

Aspects of the disclosure provide a method of video coding includes receiving input data associated with a first block and a second block of an image frame. The method further includes identifying a reference size and performing a deblocking process if it is determined that the deblocking process is to be performed. The preforming the deblocking process may include processing pixels adjacent to the block boundary using a first set of deblocking filter settings if a first block size of the first block and a second block size of the second block are greater than the reference size, and processing the pixels using a second set of deblocking filter settings if the first block size or the second block size is not greater than the reference size.

15 Claims, 10 Drawing Sheets

(56) References Cited

U.S. PATENT DOCUMENTS

| | | | |
|---|---|---|---|
| 9,445,128 B2 * | 9/2016 | He | H04N 19/139 |
| 9,554,128 B2 * | 1/2017 | Hsu | H04N 19/50 |
| 9,565,436 B2 * | 2/2017 | Norkin | H04N 19/176 |
| 9,591,302 B2 * | 3/2017 | Sullivan | H04N 19/70 |
| 9,961,372 B2 * | 5/2018 | He | H04N 19/139 |
| 2006/0098744 A1 * | 5/2006 | Huang | H04B 1/66 375/240.29 |
| 2011/0002395 A1 * | 1/2011 | Nishihara | H04N 19/117 375/240.24 |
| 2013/0294525 A1 * | 11/2013 | Norkin | H04N 19/176 375/240.24 |

* cited by examiner

METHOD AND APPARATUS OF VIDEO CODING

INCORPORATION BY REFERENCE

This present disclosure claims the benefit of U.S. Provisional Application No. 62/419,989, "Methods and apparatus for deblocking filter" filed on Nov. 10, 2016, which is incorporated herein by reference in its entirety.

TECHNICAL FIELD

The disclosed embodiments relate generally to a video coding system, and, more particularly, to a method and an apparatus of video coding by selecting a set of deblocking filter settings based on block sizes.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many video coding standards include dividing an image frame of an input video into one or more coding units. In general, a coding unit may include a prediction unit that has a luma block and at least two corresponding chroma blocks. When encoding an original image of a block, the original image of the block can be divided into a prediction portion and a residual portion of the block according to a predetermined video coding standard. When decoding the block, a reconstructed image of the block can be obtained by generating and combining the prediction portion and the residual portion of the block according to the same predetermined video coding standard. At the block boundaries where various blocks abut, blocking artifacts may be observable in the decoded image frame, and thus a deblocking process may be performed on pixels adjacent to the block boundaries in order to improve the image quality of the decoded image frame.

SUMMARY

Aspects of the disclosure provide a method of video coding includes receiving input data associated with a first block and a second block of an image frame. The first block and the second block define a block boundary therebetween, the block boundary extends along a first direction, the first block has a first block size along a second direction different from the first direction, and the second block has a second block size along the second direction. The method further includes identifying a reference size along the second direction for coding the image frame, determining, by a processing circuit of a video coding apparatus, whether to perform a deblocking process on pixels adjacent to the block boundary, and performing, by the processing circuit of the video coding apparatus, the deblocking process if it is determined that the deblocking process is to be performed. The preforming of deblocking process may include processing the pixels adjacent to the block boundary using a first set of deblocking filter settings if the first block size and the second block size are greater than the reference size, the first set of deblocking filter settings using at most a first number of pixels on each side of the block boundary, and processing the pixels adjacent to the block boundary using a second set of deblocking filter settings if the first block size or the second block size is not greater than the reference size, the second set of deblocking filter settings using at most a second number of pixels on each side of the block boundary. The second number is less than the first number.

In one embodiment, the reference size may be N pixels, N being a positive integer, and the second number may be equal to or less than N/2.

In one embodiment, the second set of filter settings may include weak filter settings and strong filter settings. In some examples, the weak filter settings of the second set of deblocking filters uses at most N/2 pixels on each side of the block boundary, and the strong filter settings of the second set of deblocking filters uses at most N/2 pixels on each side of the block boundary. In some examples, the weak filter settings of the second set of deblocking filters uses at most N/4 sample on each side of the block boundary, and the strong filter settings of the second set of deblocking filters uses at most N/2 pixels on each side of the block boundary.

In one embodiment, a line of pixels along the second direction includes two pixels, p0 and p1, of the first block and two pixels, q0 and q1, of the second block, where p0 and q0 are adjacent to the block boundary, p1 is next to p0, and q is next to q0. The weak filter settings may include generating a new value p0' to replace p0 according to p0'=(3*p1+7*p0+9*q0−3*q1+8)>>4, and the strong filter settings may include generating a new value p0' to replace p0 according to p0'=(p1+2*p0+2*q0−q1+2)>>2.

In one embodiment, the second set of deblocking filters may include unified filter settings that uses at most N/2 pixels on each side of the block boundary.

Aspects of the disclosure further provide a video coding apparatus that includes a processing circuit that is configured to receive input data associated with a first block and a second block of an image frame. The first block and the second block define a block boundary therebetween, the block boundary extends along a first direction, the first block has a first block size along a second direction different from the first direction, and the second block has a second block size along the second direction. The processing circuit is further configured to identify a reference size along the second direction for coding the image frame, determine whether to perform a deblocking process on pixels adjacent to the block boundary, and perform the deblocking process if it is determined that the deblocking process is to be performed. The processing circuit may be further configured to process the pixels adjacent to the block boundary using a first set of deblocking filter settings if the first block size and the second block size are greater than the reference size, the first set of deblocking filter settings using at most a first number of pixels on each side of the block boundary, and process the pixels adjacent to the block boundary using a second set of deblocking filter settings if the first block size or the second block size is not greater than the reference size, the second set of deblocking filter settings using at most a second number of pixels on each side of the block boundary. The second number is less than the first number.

Aspects of the disclosure further provide a non-transitory computer readable medium storing program instructions for causing a processing circuit of an apparatus to perform a video coding method. The method includes receiving input data associated with a first block and a second block of an image frame. The first block and the second block define a block boundary therebetween, the block boundary extends along a first direction, the first block has a first block size along a second direction different from the first direction, and the second block has a second block size along the second direction. The method further includes identifying a reference size along the second direction for coding the image frame, determining, by a processing circuit of a video coding apparatus, whether to perform a deblocking process on pixels adjacent to the block boundary, and performing, by the processing circuit of the video coding apparatus, the deblocking process if it is determined that the deblocking process is to be performed. The preforming the deblocking process may include processing the pixels adjacent to the block boundary using a first set of deblocking filter settings if the first block size and the second block size are greater than the reference size, the first set of deblocking filter settings using at most a first number of pixels on each side of the block boundary, and processing the pixels adjacent to the block boundary using a second set of deblocking filter settings if the first block size or the second block size is not greater than the reference size, the second set of deblocking filter settings using at most a second number of pixels on each side of the block boundary. The second number is less than the first number.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

In accordance with the present disclosure, an encoding controller or a decoding controller may select a suitable set of deblocking filter settings according to block sizes of two adjacent blocks that define a current block boundary and a reference size N. In some embodiments, when one of the block sizes of the two adjacent blocks is not greater than the reference size N, a particular set of deblocking filter settings that uses less pixels on both sides of the block boundary than a normal set of deblocking filter settings is selected in order to avoid interferences among deblocking processes corresponding to neighboring block boundaries.

Figure 1:
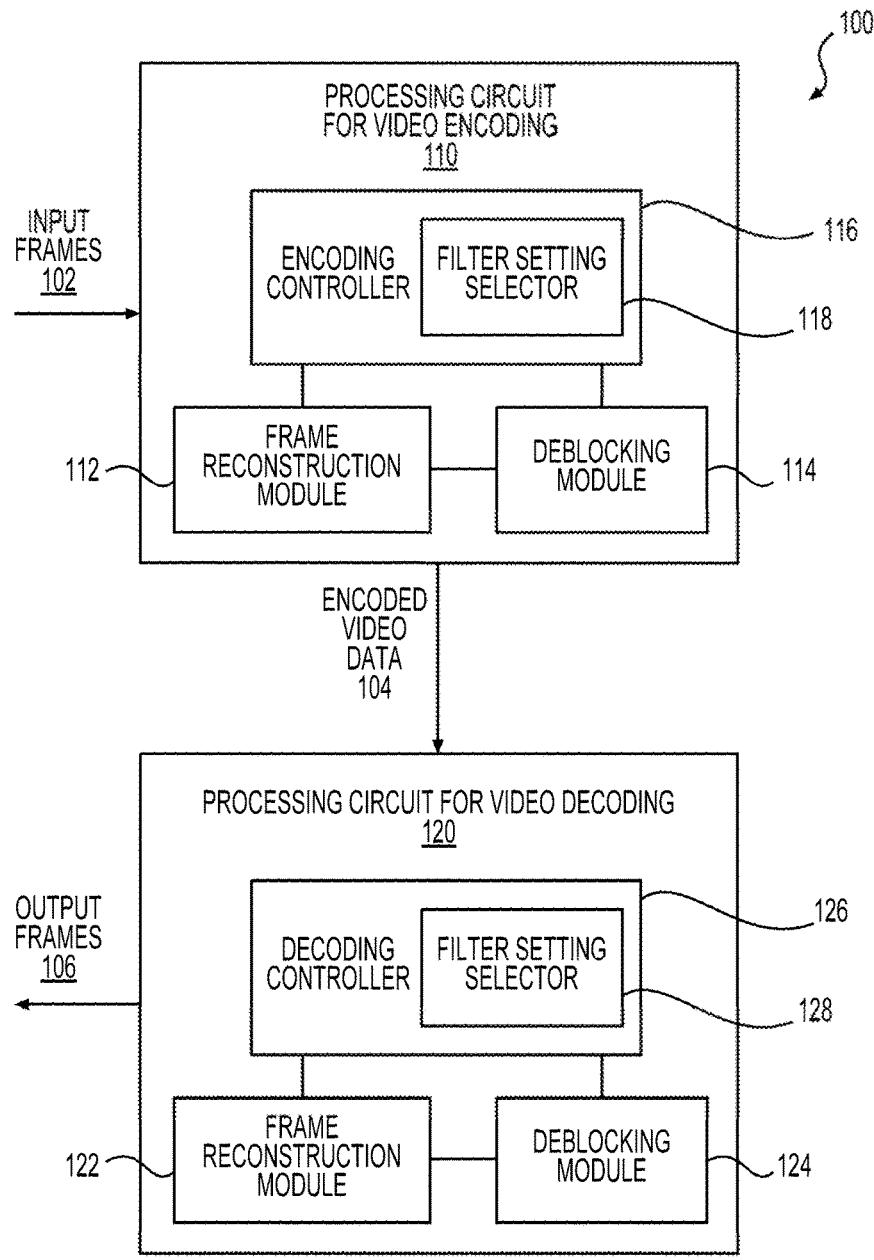
FIG. 1 shows a functional block diagram of an exemplary video coding system according to an embodiment of the disclosure.

FIG. 1 shows a functional block diagram of an exemplary video coding system 100 according to an embodiment of the disclosure. The video coding system 100 includes a processing circuit for video encoding (i.e., an encoding circuit) 110 and a processing circuit for video decoding (i.e., a decoding circuit) 120. The encoding circuit 110 receives input frames 102 as input data and generates encoded video data 104 by encoding the input frames 102. The decoding circuit 120 receives the encoded video data 104 as input data and generates output frames 106 by decoding the encoded video data 104. The video coding system 100 may be implemented by one or more video coding devices that can include the encoding circuit 110, the decoding circuit 120, or both the encoding circuit 110 and decoding circuit 120.

The encoding circuit 110 may include at least a frame reconstruction module 112, a deblocking module 114, and an encoding controller 116, where the encoding controller 116 may further include a filter setting selector 118. In some examples, the encoding controller 116 may divide an input image frame 102 into various blocks and then can determine coding parameters for each block. For example, the encoding controller 116 may divide the input image frame 102 into one or more coding tree units (CTUs), each CTU may be further divided into one or more coding blocks, and each coding block may be a combination of a prediction portion and a residue portion. In some examples, a prediction portion may be coded using Intra-Prediction or Inter-Prediction. Intra-Prediction corresponds to generating a predictor of a prediction block by extrapolating samples of neighboring pixels adjacent to the prediction block based on a prediction mode. Inter-Prediction corresponds to generating a predictor of a prediction block by a reference block from a reference image frame. The encoding controller 116 then can determine a set of coding parameters for coding the input image frame, and the set of coding parameters may include the prediction parameters and the encoded residue portions.

The encoding controller 116 can further control the frame reconstruction module 112 to generate a reconstructed image frame that corresponds to the input image frame 102 based on the determined set of coding parameters. The frame reconstruction module 112 can forward the reconstructed image frame to the deblocking module 114, where a deblocking process may be performed on the reconstructed image frame in order to minimize the visual effects caused by blocking artifacts. The filter setting selector 118 of the encoding controller 116 can determine a set of deblocking filter settings and send the set of deblocking filter settings to the deblocking module 114 for performing the deblocking process. In some examples, the resulting image frame from the deblocking module 114 may be stored and used as a reference image for encoding subsequent input image frames.

Furthermore, the encoding controller 116 can generate the encoded video data 104 based on at least the determined set of coding parameters and/or control information regarding determining the set of deblocking filter settings for processing the reconstructed frame.

In some examples, the filter setting selector 118 and the deblocking module 114 are configured to perform the deblocking process on the reconstructed image frame by checking block boundaries of the reconstructed image frame and perform the deblocking process on pixels adjacent to the respective block boundaries one after another. For example, for processing a current block boundary of the reconstructed image frame, the encoding controller 116 can identify a first block and a second block of the reconstructed image frame, where the first block abuts the second block at the current block boundary. The current block boundary may extend along a first direction. The first block may have a first block size, in units of pixels, along a second direction different from the first direction. Also, the second block may have a second block size, in units of pixels, along the second direction. The encoding controller 116 can identify a corresponding reference size N, also in units of pixels, along the second direction for coding the image frame. One of the first direction and the second direction may be a vertical direction, and the other one of the first direction and the second direction may be a horizontal direction.

The deblocking module 114 may determine whether to perform a deblocking process for the current block boundary, i.e., processing pixels of the first block and/or pixels of the second block adjacent to the current block boundary. If it is determined that the deblocking process for the current block boundary is to be performed, the filter setting selector 118 may select a suitable set of deblocking filter settings for performing the deblocking process based on the reference size N, the first block size, and the second block size.

For example, the pixels of the first block and the pixels of the second block adjacent to the current block boundary may be processed using a first set of deblocking filter settings if the first block size and the second block size are greater than the reference size N. Also, the pixels of the first block and the pixels of the second block adjacent to the current block boundary may be processed using a second set of deblocking filter settings if the first block size and the second block size are not all greater than the reference size N. In some examples, the first set of deblocking filter settings uses at most a first number of pixels on each side of the block boundary, the second set of deblocking filter settings uses at most a second number of pixels on each side of the block boundary, and the second number is less than the first number. In some examples, the second number can be equal to or less than N/2.

In some examples, when the first and second blocks are to be decoded in parallel using different processing threads, only the pixels of the first or second block of a current thread is processed using the selected set of deblocking filter settings at a time.

The reference size N may correspond to a minimum block size for a coding block. In some examples, the reference size N may correspond to a minimum block size for performing a deblocking process, which may be the same or greater than the minimum block size for a coding block. The minimum block size for a coding block or the minimum block size for performing a deblocking process can be defined in a video coding standard and/or signaled using the encoded video data. For example, the reference size N may be set to 4, 8, or 16 pixels.

The first set of deblocking filter settings may include weak filter settings and strong filter settings. In the first set of deblocking filter settings, the weak filter settings may correspond to a lower order filter or a filter that uses fewer taps than the strong filter stings. To process the pixels of the first block and/or the pixels of the second block using the first set of deblocking filter settings, the deblocking module 114 may determine a value representing a spatial activity of the pixels adjacent to the current block boundary. The deblocking module 114 may apply the strong filter settings if the determined value representing the spatial activity is less than a threshold, and applying the weak filter settings if the determined value representing the spatial activity is equal to or greater than the threshold. The value representing the spatial activity may be determined based on a predetermined number of pixels on both sides of the current boundary and located in one or more lines of pixels along the second direction. In some examples, a smaller value may represent a flatter image feature.

In some examples, the weak filter settings of the first set of deblocking filters may use at most N or more pixels on each side of the current block boundary, and the strong filter settings of the first set of deblocking filters may also use at most N or more pixels on each side of the current block boundary.

In one example, the second set of deblocking filter settings may include corresponding weak filter settings and strong filter settings. In the second set of deblocking filter settings, the weak filter settings may correspond to a lower order filter or a filter that uses fewer taps than the strong filter stings. To process the pixels of the first block and/or pixels of the second block using the second set of deblocking filter settings, the deblocking module 114 may also determine a value representing the spatial activity of the pixels adjacent to the current block boundary. The deblocking module 114 may apply the strong filter settings if the determined value representing the spatial activity is less than a threshold, and applying the weak filter settings if the determined value representing the spatial activity is equal to or greater than the threshold.

In some examples, the weak filter settings of the second set of deblocking filters may use at most N/2 pixels on each side of the current block boundary, and the strong filter settings of the second set of deblocking filters may also use at most N/2 pixels on each side of the current block boundary. In other examples, the weak filter settings of the second set of deblocking filters may use at most N/4 pixels on each side of the current block boundary, and the strong filter settings of the second set of deblocking filters may also use at most N/2 pixels on each side of the current block boundary.

In yet another example, the second set of deblocking filter settings may include unified filter settings that uses at most N/2 pixels on each side of the current block boundary. In such scenario, to process the pixels of the first block and/or the pixels of the second block using the second set of deblocking filter settings, the deblocking module 114 may apply the unified filter settings regardless of the spatial activity of the pixels adjacent to the current block boundary.

When applying the weak filter settings of the first set of deblocking filter settings or the second set of deblocking filter settings, the deblocking process may be performed in a line-by-line basis. For example, the deblocking module 114 may determine another value representing the spatial activity corresponding to a particular line of pixels along the second direction. In some examples, more pixels in a particular line will be processed using the selected set of deblocking filter settings when the spatial activity of the particular line indicates a flatter spatial activity.

For example, the deblocking module 114 may process a first pixel of the first block and/or a first pixel of the second block in the line that is adjacent to the block boundary using the weak filter settings. The deblocking module 114 may process a second pixel of the first block and/or a second pixel of the second block in the line that is next to the respective first pixel using the weak filter settings if the value representing the spatial activity of the line is less than a threshold. The deblocking module 114 may determine to skip processing the second pixels if the value representing the spatial activity of the line is equal to or greater than the threshold. Also, in some examples, the deblocking process that applies the unified filter settings of the second set of deblocking filter settings may be performed in a line-by-line basis similar to applying the weak filter settings.

In one example, assuming a line of pixels along the second direction includes four pixels, p0, p1, p2, and p3, of the first block and four pixels, and q0, q1, q2, and q3, of the second block. Pixels p0 and q0 are adjacent to the current block boundary, pixels p0, p1, p2, and p3 are next to one another and so ordered from close to far from the current block boundary, and pixels q0, q1, q2, and q3 are next to one another and so ordered from close to far from the current block boundary.

The weak filter settings of the first set of deblocking filter settings may include generating a new value p0' to replace p0 according to $$p0'=(3*p1+7*p0+9*q0-3*q1+8)>>4,$$

and generating a new value p1' to replace p1 according to $$p1'=(8*p2+19*p1-p0+9*q0-3*q1+16)>>5.$$

In some examples, generating new values q0' and/or q1' to replace q0 and/or q1 may be performed according to the above similar operations with 'p' and 'q' swapped, such as $$q0'=(3q1+7q0+9*p0-3*p1+8)>>4, \text{ and}$$

$$q1'=(8*q2+19*q1-q0+9*p0-3p1+16)>>5.$$

The strong filter settings of the first set of deblocking filter settings may include generating a new value p0' to replace p0 according to $$p0'=(p2+2p1+2*p0+2*q0+q1+4)>>3,$$

generating a new value p1' to replace p1 according to $$p1'=(p2+p1+p0-q0+2)>>2,$$

and generating a new value p2' to replace p2 according to $$p2'=(2*p3+3*p2+p+p0+4)>>3.$$

In some examples, generating new values q0', q1', and/or q2' to replace q0, q1, and/or q2 may be performed according to the above similar operations with 'p' and 'q' swapped, such as $$q0'=(q2+2*q1+2*q0+2*p0+p1+4)>>3,$$

$$q1'=(q2+q1+q0-p0+2)>>2,$$

$$q2'=(2*q3+3*q2+q1+q0+4)>>3.$$

The weak filter settings of the second set of deblocking filter settings may include generating a new value p0' to replace p0 according to $$p0'=(3*p1+7*p0+9*q0-3*q1+8)>>4$$

and generating a new value q0' to replace q0 according to $$q0'=(3*q1+7*q0+9*p0-3*p1+8)>>4.$$

The strong filter settings of the second set of deblocking filter settings may include generating a new value p0' to replace p0 according to $$p0'=(p1+2*p0+2*q0-q1+2)>>2$$

and generating a new value q0' to replace q0 according to $$q0'=(q1+2*q0+2*p0-p1+2)>>2.$$

Of course, the aforementioned filter settings are used as non-limiting examples. The first set of filter settings and the second set of filter settings may include other suitable filter settings. Also, additional operations, such as a clipping operation or other suitable operations, may be performed as part of a deblocking process.

In some examples, whether to enable selecting different sets of filter settings and/or which filter settings are available may be defined in a video coding standard and/or signaled using the control information included in the encoded video data 104.

Although the filter setting selector 118 is depicted in FIG. 1 as part of the encoding controller 116, the filter setting selector 118 may be implemented as a stand-alone controller or as part of the deblocking module 114. The operations of the filter setting selector 118 and the deblocking module 114 are further illustrated using examples with reference to FIGS. 2-3.

The decoding circuit 120 may include at least a frame reconstruction module 122, a deblocking module 124, and a decoding controller 126, where the decoding controller 126 may further include a filter setting selector 128. In some examples, the decoding controller 126 may receive the encoded video data 104 from the encoding circuit 110 and extract or derive a set of coding parameters and/or control information regarding the selection of a suitable set of deblocking filter settings for decoding a current image frame. The decoding controller 126 can further control the frame reconstruction module 122 to generate a reconstructed image frame, which may include various blocks each has a prediction portion and a residue portion generated based on the set of coding parameters.

The frame reconstruction module 122 can forward the reconstructed image frame to the deblocking module 124, where a deblocking process may be performed on the reconstructed frame in order to minimize the visual effects caused by blocking artifacts. The filter setting selector 128 of the decoding controller 126 can determine a set of filter settings and send the selected set of filter settings to the deblocking module 124 for performing the deblocking process. In some examples, the resulting image frame from the deblocking module 124 may be stored and output as output frames and/or used as a reference image for decoding subsequent image frames.

In some examples, the filter setting selector 128 and the deblocking module 124 are configured to perform the deblocking process on the reconstructed image frame in a manner similar to the operations of the filter setting selector 118 and the deblocking module 114, and detailed description thereof is thus omitted. Also, although the filter setting selector 128 is depicted in FIG. 1 as part of the decoding controller 126, the filter setting selector 128 may be implemented as a stand-alone controller or as part of the deblocking module 124.

Moreover, an image frame to be encoded or decoded can be divided into different coding tree units that correspond to different color space components. The deblocking process for a luma component of the image frame may be performed as described above. The deblocking process for a chroma component of the image frame may be performed as described above or may be performed using a simplified set of filter settings that uses at most N/2 pixels on each side of the block boundary. In at least one non-limiting example, the simplified set of filter settings may include generating a new value p0' to replace p0 according to $p0'=(p1+4*p0+4*q0-q1+4)>>3$ and generating a new value q0' to replace q0 according to $q0'=(q1+4*q0+4*p0-p1+4)>>3$.

In operation, the encoding controller 116 of the encoding circuit 110 receives an input frame 102 and determines coding parameters for coding the input image frame. The frame reconstruction module 112 generates a reconstructed image frame based on the determined coding parameters. The filter setting selector 118 and the deblocking module 114 perform a deblocking process on the reconstructed image frame from the frame reconstruction module 112 by identifying block boundaries and the corresponding adjacent blocks of the reconstructed image frame and then process the pixels adjacent to the block boundaries one block boundary at a time. The filter setting selector 118 can determine a suitable set of filter settings based on a reference size N and the block sizes of the blocks that define a current block boundary and determine how to process the pixels adjacent to the current block boundaries as described above.

Figure 2:
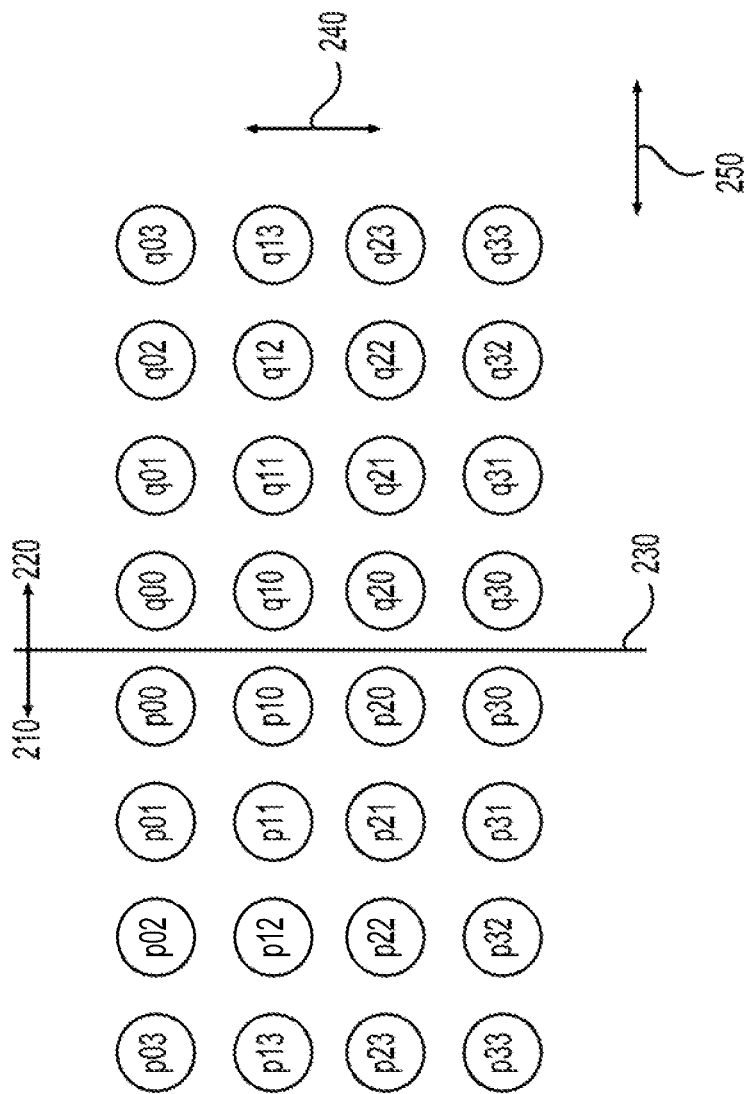
FIG. 2 shows a diagram of two exemplary blocks that define a block boundary extending therebetween along a vertical direction for illustrating a deblocking process according to an embodiment of the disclosure.

FIG. 2 shows a diagram of two exemplary blocks 210 and 220 that define a block boundary 230 extending therebetween along a vertical direction 240 for illustrating a deblocking process according to an embodiment of the disclosure. FIG. 2 shows 16 pixels p00-p33 of the block 210 and 16 pixels q00-q33 of the block 220, which may constitute the entire or a portion of the blocks 210 and 220, respectively.

During a deblocking process, a deblocking module, such as the deblocking module 114 or 124 in FIG. 1, may identify boundaries in a reconstructed image frame, where each boundary is defined between two adjacent blocks of the reconstructed image frame. A filter setting selector, such as the filter setting selector 118 or 128, can identify a reference size (e.g., N pixels) along a horizontal direction 250. For example, the reference size N may be 4 pixels in the examples illustrated with reference to FIG. 2.

The deblocking module 114 or 124 can first determine whether to perform a deblocking process on the pixels adjacent to the block boundary 230 by analyzing coding parameters for the blocks 210 and 220 and performing a feature analysis of the pixels. For example, the coding parameters for the blocks 210 and 220 may be analyzed such that a boundary strength (Bs) value can be assigned to the boundary 230 according to the following table.

| Conditions | Bs |
|---|---|
| At least one of the blocks is Intra | 2 |
| At least one of the blocks has non-zero coded residual coefficient and boundary is a transform boundary | 1 |
| Absolute differences between corresponding spatial motion vector components of the two blocks are >= 1 in units of inter pixels | 1 |
| Motion-compensated prediction for the two blocks refers to different reference pictures or the number of motion vectors is different for the two blocks | 1 |
| Otherwise | 0 |

In some examples, if the coding parameters for the blocks 210 and 220 indicate that the boundary strength value of the boundary 230 is zero, than the deblocking process for the boundary 230 may be skipped. If the boundary strength value of the boundary 230 is one or greater, than the deblocking module 114 or 124 can further determine whether the deblocking process for the boundary 230 should be performed based on a feature analysis to determine if the boundary 230 is more likely to correspond to an image feature thus the deblocking process may be skipped in order to preserve the image feature.

For example, for the feature analysis, the deblocking module 114 or 124 can select two lines of pixels along the horizontal direction and select four pixels on each line on each side of the block boundary 230, such as pixels p00, p01, p02, p03, q00, q01, q02, and q03 of a first line in FIG. 2 and pixels p30, p31, p32, p33, q30, q31, q32, and q33 of a fourth line in FIG. 2, to determine a derivation value that represents spatial activity of the pixels adjacent to the block boundary 230. If the derivation value is equal to or greater than a predetermined threshold, it is determined that the block boundary 230 may correspond to an image feature and thus the deblocking process may be skipped. If the derivation value is less than the predetermined threshold, it is determined that the deblocking process for the block boundary 230 is to be performed.

The filter setting selector 118 or 128 can then select a suitable set of filtering settings for the blocks 210 and 220 based on a block size and the reference size N.

In one example, if block 210 has a block size along the horizontal direction (i.e., a block width) of 8 or more pixels, and block 220 has a block size along the horizontal direction of 8 or more pixels. Both the block widths of the blocks 210 and 220 are greater than N (=4 pixels in this example). Therefore, the filter setting selector 118 or 128 can select a first set of filter settings for processing the pixels adjacent to the boundary 230. In some examples, the first set of filter settings can use more than two pixels on each side of the block boundary 230. In the example illustrated with reference to FIG. 1, the first set of filter settings includes weak filter settings that may use at most four (4) pixels on each side of the block boundary 230 and strong filter settings that also may use at most four (4) pixels on each side of the block boundary 230.

In another example, if block 210 has a block width of 4 pixels, and block 220 has a block width of 8 or more pixels, one of the block widths is thus not greater than the N (=4 pixels in this example). Therefore, the filter setting selector 118 or 128 can select a second set of filter settings for processing the pixels adjacent to the boundary 230. In some examples, the first set of filter settings can use at most a first number of pixels on each side of the block boundary 230, the second set of filter settings can use at most a second number of pixels on each side of the block boundary 230, and the second number is less than the first number.

In some examples, the second set of filter settings include weak filter settings that may use at most N/2 pixels on each side of the block boundary 230 and strong filter settings that may also use at most N/2 pixels on each side of the block boundary 230. In other examples, the second set of filter settings include weak filter settings that may use at most N/4 pixels on each side of the block boundary 230 and strong filter settings that may also use at most N/2 pixels on each side of the block boundary 230. In yet another example, the second set of filter settings include unified filter settings that may use at most N/2 pixels on each side of the block boundary 230.

After the filter setting selector 118 or 128 determine a suitable set of filter settings for processing the pixels adjacent to the boundary 230, the deblocking module 114 or 124 can perform the deblocking process on the pixels based on the selected set of filter settings. For example, the deblocking module 114 or 124, if applicable, can first determine whether to apply the strong filter settings or the weak filter settings based on a first spatial activity of the pixels. In some examples, the first spatial activity may be determined by analyze the pixels used during the feature analysis described above. If a first value representing the first spatial activity is less than a threshold, it is determined that the pixels correspond to a low spatial activity region or a flatter region such that blocking distortions may be more observable than the corresponding image features. Therefore, the deblocking module 114 or 124 may apply the strong filter settings. Otherwise, the deblocking module 114 or 124 may apply the weak filter settings, where the deblocking module 114 or 124 may process the first pixels adjacent to the boundary and determine whether to process the second pixels next to the first pixels based on a second spatial activity of a corresponding line of pixels along the horizontal direction 250.

Figure 3:
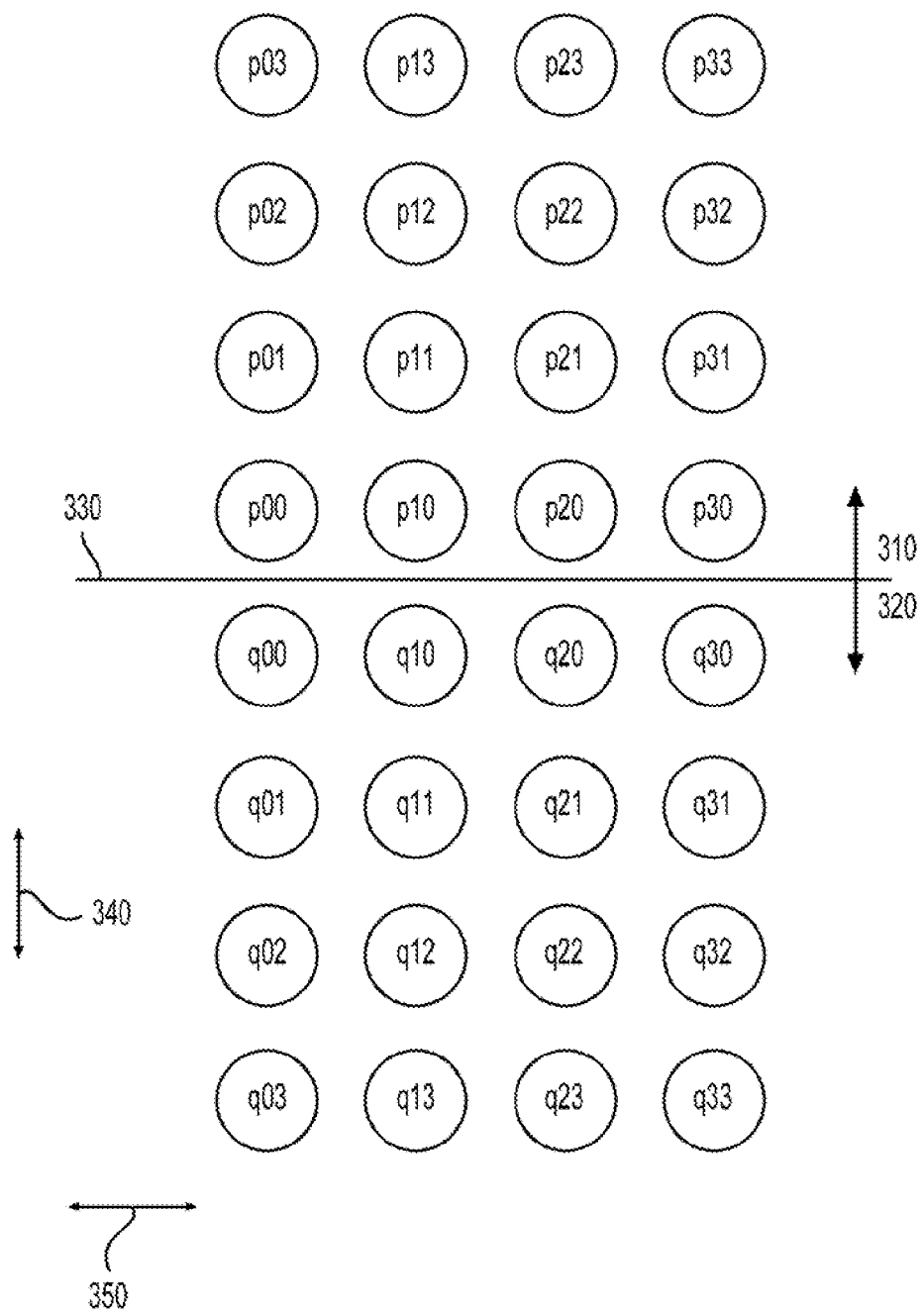
FIG. 3 shows a diagram of two exemplary blocks that define a block boundary extending therebetween along a horizontal direction for illustrating a deblocking process according to an embodiment of the disclosure.

FIG. 3 shows a diagram of a portion of two exemplary blocks 310 and 320 that define a block boundary 330 extending therebetween along a horizontal direction 350 for illustrating a deblocking process according to an embodiment of the disclosure. FIG. 3 shows 16 pixels p00-p33 of the block 310 and 16 pixels q00-q33 of the block 320, which may constitute the entire or a portion of the blocks 310 and 320, respectively.

The deblocking process for the pixels adjacent to the block boundary 330 may be performed in a manner similar to the deblocking process for the pixels adjacent to the block boundary 230 as illustrated with reference to FIG. 2, except for the different orientations of the block boundaries and lines of pixels. For example, the deblocking module 114 or 124 can first determine whether to perform a deblocking process on the pixels adjacent to the block boundary 330 by analyzing coding parameters for the blocks 310 and 320 and a feature analysis of the pixels as described with reference to FIG. 2. The filter setting selector 118 or 128 can then select a suitable set of filtering settings for the blocks 310 and 320 based on a block size along the vertical direction 340 and the reference size N as illustrated with reference to FIG. 2.

In one example, if block 310 has a block size along the vertical direction (i.e., a block height) of 8 or more pixels, and block 320 has a block size along the vertical direction of 8 or more pixels. Both the block heights of the blocks 310 and 320 are greater than N (=4 pixels in this example). Therefore, the filter setting selector 118 or 128 can select a first set of filter settings for processing the pixels adjacent to the boundary 330. In another example, if block 310 has a block height of 4 pixels, and block 320 has a block height of 8 or more pixels, one of the block heights is not greater than the N (=4 pixels in this example). Therefore, the filter setting selector 118 or 128 can select a second set of filter settings for processing the pixels adjacent to the boundary 330.

After the filter setting selector 118 or 128 determine a suitable set of filter settings for processing the pixels adjacent to the boundary 230, the deblocking module 114 or 124 can perform the deblocking process on the pixels based on the selected set of filter settings as illustrated with reference to FIG. 2.

Figure 4:
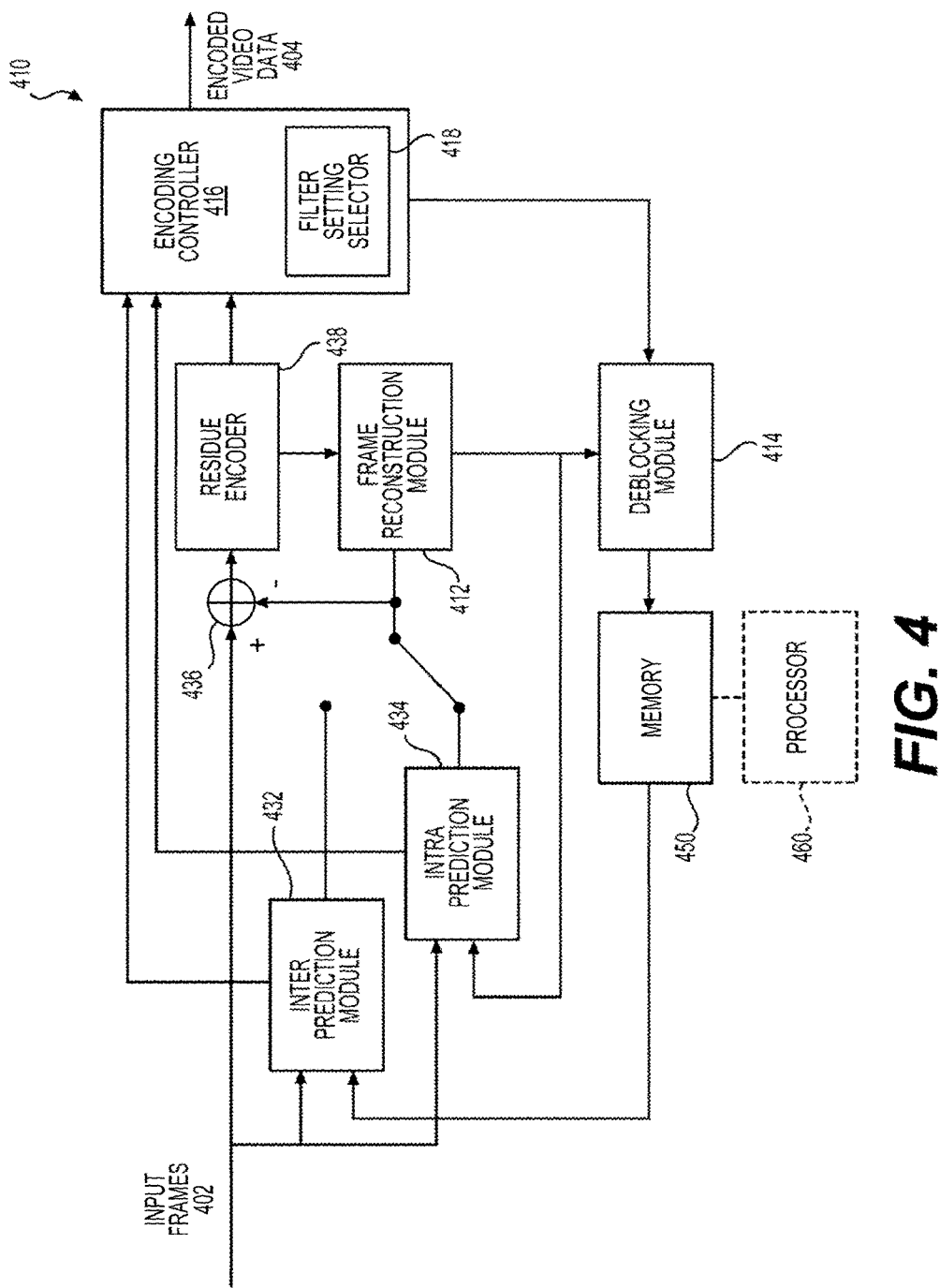
FIG. 4 shows a functional block diagram of an exemplary encoding circuit in the video coding system in FIG. 1 according to an embodiment of the disclosure.

FIG. 4 shows a functional block diagram of an exemplary encoding circuit 410 in a video coding system, such as the encoding circuit 110 in the video coding system 100 in FIG. 1, according to an embodiment of the disclosure. FIG. 4 is a simplified illustration of the encoding circuit 410 and thus may not show all the details and variations of the encoding circuit 410.

The encoding circuit 410 includes a frame reconstruction module 412, a deblocking module 414, an encoding controller 416, and a filter setting selector 418 in the encoding controller 416, which may correspond to the frame reconstruction module 112, the deblocking module 114, the encoding controller 116, and the filter setting selector 118 in FIG. 1, respectively. The encoding circuit 410 also includes an inter prediction module 432, an intra prediction module 434, an adder 436, a residue encoder 438, a memory 450, and a processor 460.

The encoding controller 416 supervises the operations of the frame reconstruction module 412, the deblocking module 414, the inter prediction module 432, the intra prediction module 434, the adder 436, and/or the residue encoder 438. The encoding controller 416 may instruct the inter prediction module 432 and/or the intra prediction module 434 to divide each input frame 402 into blocks and to determine the prediction scheme, prediction mode, and/or corresponding prediction parameters for each block. The encoding controller 416 may select one of the inter prediction module 432 and/or the intra prediction module 434 to output a corresponding final predictor of a current block to the adder 436. The adder 436 receives an original image of the current block and the final predictor of the current block and outputs a residual portion of the current block by subtracting the final predictor from the original image of the current block. The residue encoder 438 receives and encodes the residual portion of the current block. The encoding controller 416 may generate the encoded video data 404 based on the prediction parameters from the inter prediction module 432 and/or the intra prediction module 434 and the output from the residue encoder 438.

The frame reconstruction module 412 may receive the final predictor from the inter prediction module 432 and/or the intra prediction module 434 and a reconstructed residual portion of the current block from the residue encoder 438. Based on such information, the frame reconstruction module 412 may generate reconstructed blocks and collect all the reconstructed blocks into a reconstructed image frame that corresponds to a current input image frame 402. The frame reconstruction module 412 may output the reconstructed blocks to the intra prediction module 434 as reference pixels for intra prediction of a next block or image frame. The frame reconstruction module 412 may output the reconstructed image frame to the deblocking module 414 for further deblocking process.

Also, the filter setting selector 418 determines a suitable set of filter settings for processing the reconstructed image frame as described with reference to FIGS. 1-3. The deblocking module 414 receives the reconstructed image frame from the frame reconstruction module 412 and performs a deblocking process using the determined set of filter settings as described with reference to FIGS. 1-3. The deblocking module 414 can output the processed image frame, where the reconstructed image frame may be filtered in whole or in part or not filtered at all as described with reference to FIGS. 1-3, to the memory 450. The processed image frame can be stored in the memory 450 and is accessible by the inter prediction module 432 as a reference frame for inter prediction of a next block or image frame.

Moreover, as shown in FIG. 4, the processor 460 is electrically coupled with the memory 450 and can be configured to execute program instructions stored in the memory 450 to perform various functions. The processor 460 can include a single or multiple processing cores. Various components of the encoding circuit 410, such as the encoding controller 116, the frame reconstruction module 412, the deblocking module 414, the inter prediction module 432, the intra prediction module 434, the adder 436, and/or the residue encoder 438, may be implemented by hardware components, the processor 460 executing the program instructions, or a combination thereof. Of course, the processor 460 can also execute program instructions to control receiving of the input frames 402 and the output of the encoded video data 404. In some examples, the processor 460 can execute program instructions to perform functions that may not be directly related to encoding the encoded video data 404.

The memory 450 can be used to store the program instructions, information corresponding to the prediction parameters reconstructed blocks, input frames, and/or intermediate data for performing various functions of the encoding circuit 410. In some examples, the memory 450 includes a non-transitory computer readable medium, such as a semiconductor or solid-state memory, a random access memory (RAM), a read-only memory (ROM), a hard disk, an optical disk, or other suitable storage medium. In some embodiments, the memory 450 includes a combination of two or more of the non-transitory computer readable mediums listed above.

Figure 5:
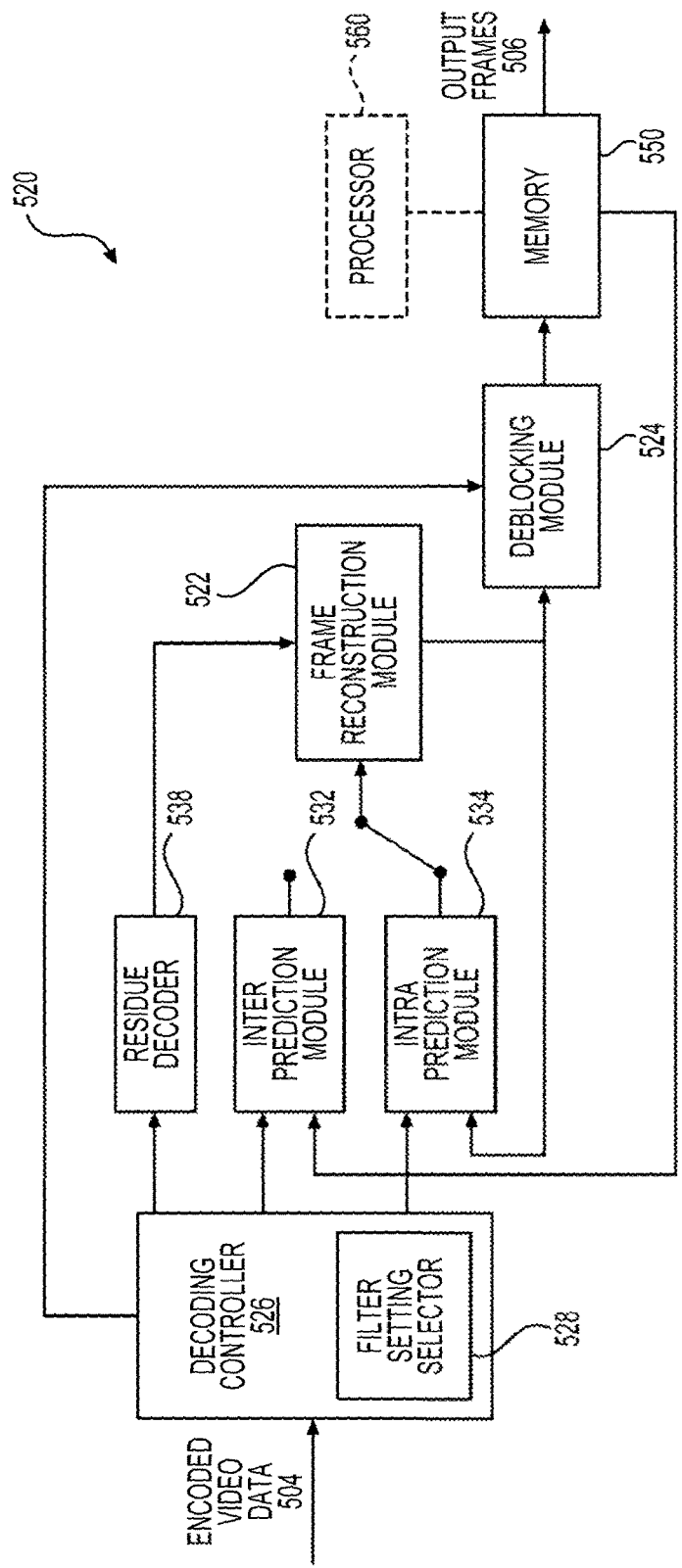
FIG. 5 shows a functional block diagram of an exemplary decoding circuit in the video coding system in FIG. 1 according to an embodiment of the disclosure.

FIG. 5 shows a functional block diagram of an exemplary decoding circuit 520 in a video coding system, such as the decoding circuit 120 in the video coding system 100 in FIG. 1, according to an embodiment of the disclosure. FIG. 5 is a simplified illustration of the decoding circuit 520 and thus may not show all the details and variations of the decoding circuit 520.

The decoding circuit 520 includes a frame reconstruction module 522, a deblocking module 524, a decoding controller 526, and a filter setting selector 528 in the decoding controller 526, which may correspond to the frame reconstruction module 122, the deblocking module 124, the decoding controller 126, and the filter setting selector 128 in FIG. 1, respectively. The decoding circuit 520 also includes an inter prediction module 532, an intra prediction module 534, a residue decoder 538, a memory 550, and a processor 560.

The decoding controller 526 receives and analyzes the encoded video data 504 and extracts residue information and prediction parameters for decoding various blocks of a current image frame. For each block, the decoding controller 526 can instruct the inter prediction module 532 or the intra prediction module 534 to generate a prediction portion of the block and can instruct the residue decoder 538 to generate a residue portion of the block. The frame reconstruction module 522 can receive the prediction portions and residue portions of various blocks of the current image frame and generate reconstructed blocks by combining the respective prediction portions and residue portions. The frame reconstruction module 522 may collect all the reconstructed blocks into a reconstructed image frame that corresponds to the current input image frame. The frame reconstruction module 522 may output the reconstructed blocks to the intra prediction module 534 as reference pixels for intra prediction of a next block or image frame. The frame reconstruction module 522 may output the reconstructed image frame to the deblocking module 524 for further deblocking process.

The filter setting selector 528, like the filter setting selector 418 in FIG. 4, may determine a suitable set of filter settings for processing the reconstructed image frame as described with reference to FIGS. 1-3. The deblocking module 524 receives the reconstructed image frame from the frame reconstruction module 522 and performs a deblocking process using the determined set of filter settings as described with reference to FIGS. 1-3. The deblocking module 524 can output the processed image frame, where the reconstructed image frame may be filtered in whole or in part or not filtered at all as described with reference to FIGS. 1-3, to the memory 550. The processed image frame can be stored in the memory 550 and is accessible by the inter prediction module 532 as a reference frame for inter prediction of a next block or image frame. Also, the processed image frame can be output from the memory 550 as an output image frame 506.

Moreover, as shown in FIG. 5, the processor 560 is electrically coupled with the memory 550 and can be configured to execute program instructions stored in the memory 550 to perform various functions. The processor 560 can include a single or multiple processing cores. Various components of the decoding circuit 520, such as the decoding controller 526, the frame reconstruction module 522, the deblocking module 524, the inter prediction module 532, the intra prediction module 534, and/or the residue decoder 538, may be implemented by hardware components, the processor 560 executing the program instructions, or a combination thereof. Of course, the processor 560 can also execute program instructions to control receiving of the encoded video data 504 and the output of the output image frames 506. In some examples, the processor 560 can execute program instructions to perform functions that may not be directly related to decoding the encoded video data 504.

The memory 550 can be used to store the program instructions, information corresponding to the prediction parameters reconstructed blocks, input frames, and/or intermediate data for performing various functions of the decoding circuit 510. In some examples, the memory 550 includes a non-transitory computer readable medium, such as a semiconductor or solid-state memory, a random access memory (RAM), a read-only memory (ROM), a hard disk, an optical disk, or other suitable storage medium. In some embodiments, the memory 550 includes a combination of two or more of the non-transitory computer readable mediums listed above.

Moreover, the encoding circuit 410 in FIG. 4 and the decoding circuit 520 in FIG. 5 may be implemented in the same electronic device, and various components of the encoding circuit 410 and the decoding circuit 520 may be shared or reused. For example, one or more of the memory 450, processor 460, intra prediction module 432, intra prediction module 434, filter setting selector 418, and deblocking module 414 in the encoding circuit 410 may also be used to function as the memory 550, processor 560, intra prediction module 532, intra prediction module 534, filter setting selector 528, and deblocking module 524 in FIG. 5, respectively.

Figure 6:
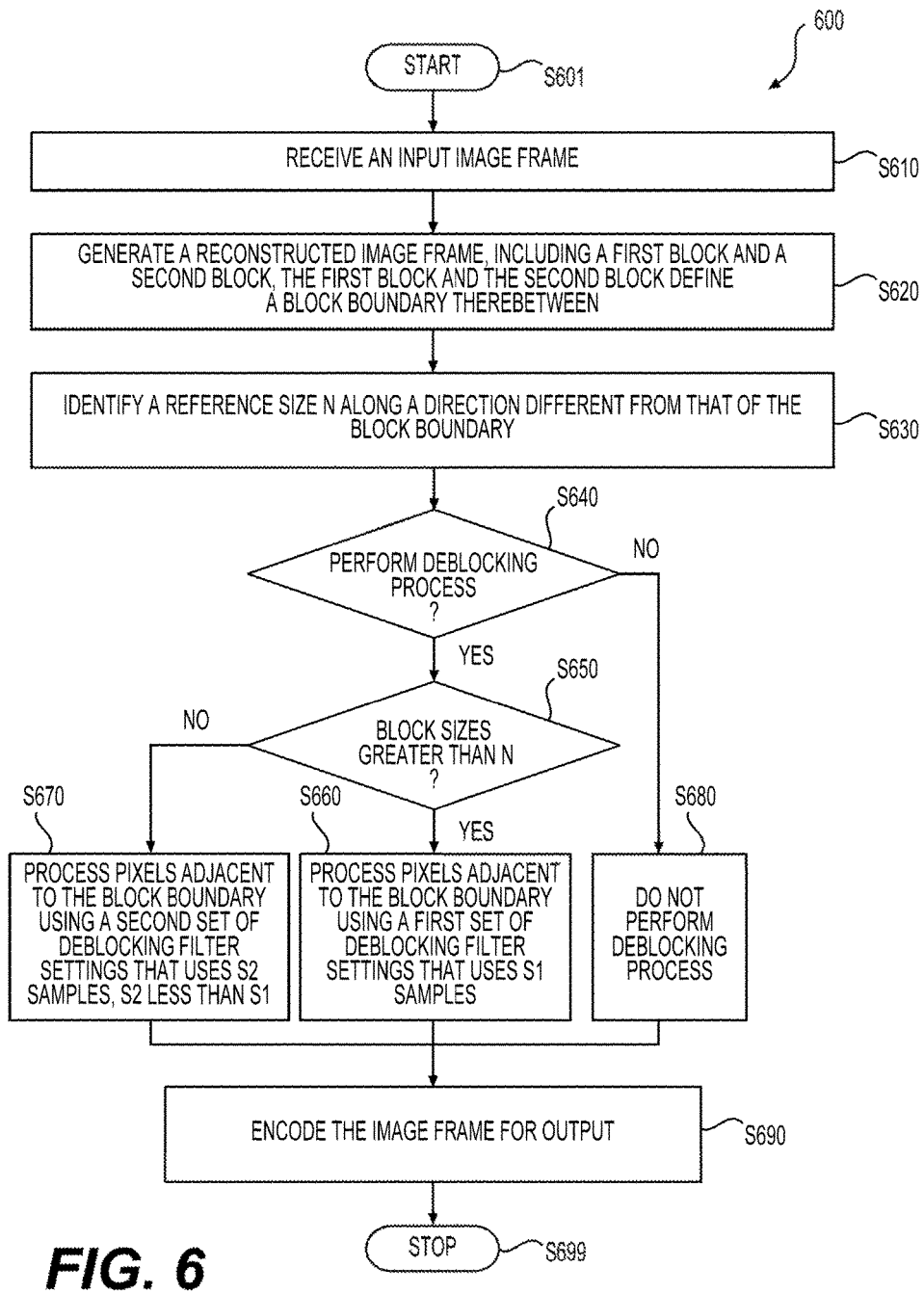
FIG. 6 shows a flow chart outlining an exemplary video encoding process, including determining whether to perform a deblocking process and how to perform the deblocking process, according to an embodiment of the disclosure.

FIG. 6 shows a flow chart outlining an exemplary video encoding process 600, including determining whether to perform a deblocking process and how to perform the deblocking process, according to an embodiment of the disclosure. The process 600 may be performed by an encoding circuit, such as the encoding circuit 110 in FIG. 1 or the encoding circuit 410 in FIG. 4. It is understood that additional operations may be performed before, during, and/or after the process 600 depicted in FIG. 6. The process 600 starts at S601 and proceeds to S610.

At S610, input data regarding an input image frame is received. The input image frame may be divided into various blocks for further encoding processes. A set of coding parameters may be determined for encoding the image frame. For example, the encoding circuit 110 or 410 may receive an input image frame, and the encoding controller 116 or 416 may work with the inter prediction module 432, the intra prediction module 434, and the residue encoder 438 to determine a set of coding parameters for encoding the input image frame.

At S620, a reconstructed image frame corresponding to the input image frame is generated. The reconstructed image frame may include a first block and a second block, where the first block and the second block define a block boundary therebetween extending along a first direction, such as a vertical direction or a horizontal direction. For example, the frame reconstruction module 112 or 412 may generate a reconstructed image frame that includes two adjacent blocks 210 and 220 that define a block boundary 230, or two adjacent blocks 310 and 320 that define a block boundary 330.

At S630, a reference size N along a second direction different from the first direction is identified. In some examples, the reference size N may correspond to a minimum block size for a coding block. In some examples, the reference size N may correspond to a minimum block size for performing a deblocking process, which may be the same or greater than the minimum block size for a coding block. In some examples, the encoding controller 116 or 416 may identify the reference size N according to a predetermined video coding standard. In the examples illustrated with reference to FIGS. 2 and 3, the reference size N may be set to 4 pixels.

At S640, it is determined whether a deblocking process is to be performed on the pixels adjacent to the block boundary. An exemplary implementation of S640 is further illustrated with reference to FIG. 8. If it is determined that the deblocking process is to be performed, the process proceeds to S650. Otherwise, the process proceeds to S680. For example, the deblocking module 114 or 414 can determine whether to perform the deblocking process by analyzing coding parameters for the blocks and performing a feature analysis of the pixels adjacent to the boundary as illustrated with reference to FIG. 2.

At 8650, it is determined whether a first block size of the first block along the second direction and a second block size of the second block along the second direction are both greater than the reference size N. If both the first and second block sizes are greater than the reference size N, the process proceeds to S660. If one of the first and second block sizes is not greater than the reference size N, the process proceeds to S670. For example, the filter setting selector 118 or 418 can determine whether both the first and second block sizes are greater than the reference size N as illustrated with reference to FIGS. 1-4.

At S660, because both the first and second block sizes are greater than the reference size N, a first set of filter settings is selected for processing the pixels adjacent to the block boundary. The first set of filter settings may use at most S1 samples on each side of the block boundary. For example, the filter setting selector 118 or 418 can select a first set of filter settings in response to the decision that both the first and second block sizes are greater than the reference size N as illustrated with reference to FIGS. 1-4. The deblocking module 114 or 414 can perform the deblocking process using the first set of filter settings as illustrated with reference to FIGS. 1-4.

At S670, because one of the first and second block sizes is not greater than the reference size N, a second set of filter settings is selected for processing the pixels adjacent to the block boundary. The second set of filter settings may use at most S2 samples on each side of the block boundary, where S2 is less than S1. For example, the filter setting selector 118 or 418 can select a second set of filter settings in response to the decision that one of the first and second block sizes is not greater than the reference size N as illustrated with reference to FIGS. 1-4. The deblocking module 114 or 414 can perform the deblocking process using the second set of filter settings as illustrated with reference to FIGS. 1-4.

At S680, no deblocking process is performed on the pixels adjacent to the block boundary.

In some examples, S630 to S680 may be repetitively performed to process every block boundary in the reconstructed image frame until all the block boundaries are processed by either S660, S670, or S680.

At S690, the input image frame is encoded for output. In some examples, a processed reconstructed image frame that includes the processed pixels is stored in a memory as a reference image frame for performing an inter prediction on a next block or a next image frame. For example, the memory 450 stores the processed reconstructed image frame from the deblocking module 414, which is made accessible to the inter prediction module 432 for a future inter prediction process.

After S690, the process proceeds to S699 and terminates.

Figure 7:
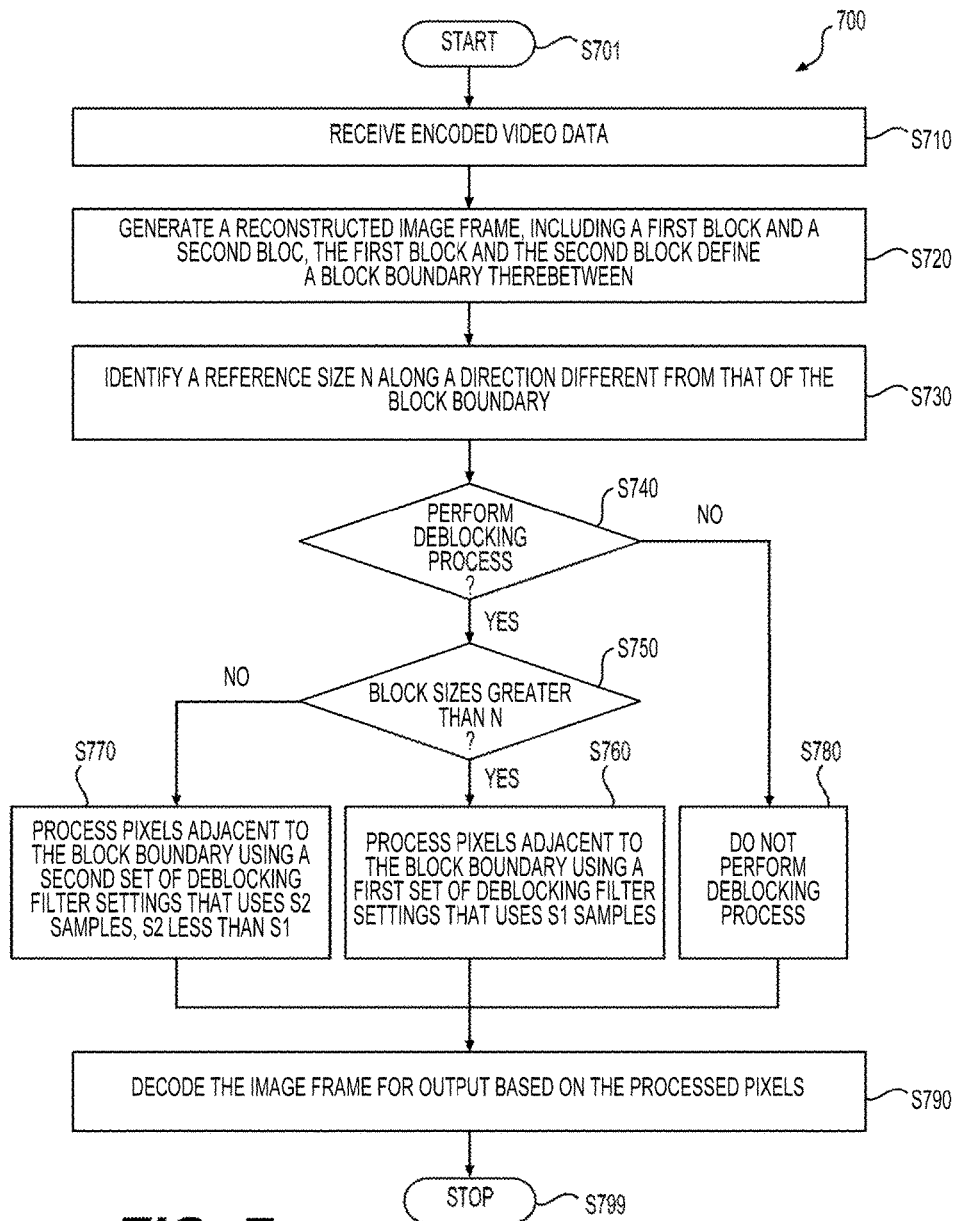
FIG. 7 shows a flow chart outlining an exemplary video decoding process, including determining whether to perform a deblocking process and how to perform the deblocking process, according to an embodiment of the disclosure.

FIG. 7 shows a flow chart outlining an exemplary video decoding process 700, including determining whether to perform a deblocking process and how to perform the deblocking process, according to an embodiment of the disclosure. The process 700 may be performed by a decoding circuit, such as the decoding circuit 120 in FIG. 1 or the decoding circuit 520 in FIG. 5. It is understood that additional operations may be performed before, during, and/or after the process 700 depicted in FIG. 7. The process 700 starts at S701 and proceeds to S710.

At S710, input data, such as encoded video data regarding decoding an image frame is received. The image frame may include plural blocks to be decoded. A set of coding parameters may be extracted from the encoded video data for decoding the image frame. For example, the decoding circuit 120 or 520 may receive the encoded video data, and the decoding controller 126 or 526 may extract coding parameters from the encoded video data, either explicitly provided or implicitly derived, for various blocks of an image frame.

At S720, a reconstructed image frame corresponding to the image frame is generated. The reconstructed blocks of the various blocks of the image frame are generated based on the coding parameters thereof, and the reconstructed blocks are collected to become a reconstructed frame. The reconstructed image frame may include a first block and a second block, where the first block and the second block define a block boundary therebetween extending along a first direction, such as a vertical direction or a horizontal direction. For example, the decoding controller 126 or 526 may work with the inter prediction module 532, the intra prediction module 534, and the residue decoder 538 to generate prediction portions and residue portions of the blocks of the image frame. The frame reconstruction module 122 or 422 may generate reconstructed blocks based on the prediction portions from the inter prediction module 532 and/or the intra prediction module 534 and the residue portions from the residue decoder 538. The frame reconstruction module 122 or 422 may further generate a reconstructed image frame based on the reconstructed blocks, which includes two adjacent blocks 210 and 220 that define a block boundary 230, or two adjacent blocks 310 and 320 that define a block boundary 330.

At S730, a reference size N along a second direction different from the first direction is identified. In some examples, the reference size N may correspond to a minimum block size for a coding block. In some examples, the reference size N may correspond to a minimum block size for performing a deblocking process, which may be the same or greater than the minimum block size for a coding block. In some examples, the decoding controller 126 or 526 may identify the reference size N according to a predetermined video coding standard. For example, the decoding controller 126 or 526 may identify the reference size N as explicitly provided in the encoded video data or implicitly derived according to the predetermined video coding standard based on the information provided in the encoded video data. In the examples illustrated with reference to FIGS. 2 and 3, the reference size N may be set to 4 pixels.

At S740, it is determined whether a deblocking process is to be performed on the pixels adjacent to the block boundary. In some examples, S740 may be performed in a manner similar to S640, which is further illustrated with reference to FIG. 8. If it is determined that the deblocking process is to be performed, the process proceeds to S750. Otherwise, the process proceeds to S780. For example, the deblocking module 124 or 524 can determine whether to perfume the deblocking process by analyzing coding parameters for the blocks and performing a feature analysis of the pixels adjacent to the boundary as illustrated with reference to FIG. 2.

At S750, it is determined whether a first block size of the first block along the second direction and a second block size of the second block along the second direction are both greater than the reference size N. If both the first and second block sizes are greater than the reference size N, the process proceeds to S760. If one of the first and second block sizes is not greater than the reference size N, the process proceeds to S770. For example, the filter setting selector 128 or 528 can determine whether both the first and second block sizes are greater than the reference size N as illustrated with reference to FIGS. 1-3 and 5.

At S760, because both the first and second block sizes are greater than the reference size N, a first set of filter settings is selected for processing the pixels adjacent to the block boundary. The first set of filter settings may use at most S1 samples on each side of the block boundary. For example, the filter setting selector 128 or 528 can select a first set of filter settings in response to the decision that both the first and second block sizes are greater than the reference size N as illustrated with reference to FIGS. 1-3 and 5. The deblocking module 124 or 524 can perform the deblocking process using the first set of filter settings as illustrated with reference to FIGS. 1-3 and 5.

At S770, because one of the first and second block sizes is not greater than the reference size N, a second set of filter settings is selected for processing the pixels adjacent to the block boundary. The second set of filter settings may use at most S2 samples on each side of the block boundary, where S2 is less than S1. For example, the filter setting selector 128 or 528 can select a second set of filter settings in response to the decision that one of the first and second block sizes is not greater than the reference size N as illustrated with reference to FIGS. 1-3 and 5. The deblocking module 124 or 524 can perform the deblocking process using the second set of filter settings as illustrated with reference to FIGS. 1-3 and 5.

At S780, no deblocking process is performed on the pixels adjacent to the block boundary.

In some examples, S730 to S780 may be repetitively performed to process every block boundary in the reconstructed image frame until all the block boundaries are processed by either S760, S770, or S780.

At S790, the processed reconstructed image frame, including the pixels processed by either S760, S770, or S780, is stored in a memory for output as the decoded image frame. In some examples, a processed reconstructed image frame that includes the processed pixels is stored in the memory as a reference image frame for decoding a next block or a next image frame using an inter prediction. For example, the memory 550 stores the processed reconstructed image frame from the deblocking module 524, which is to be output as an output image frame and is made accessible to the inter prediction module 532 for a future inter prediction process.

After S790, the process proceeds to S799 and terminates.

Figure 8:
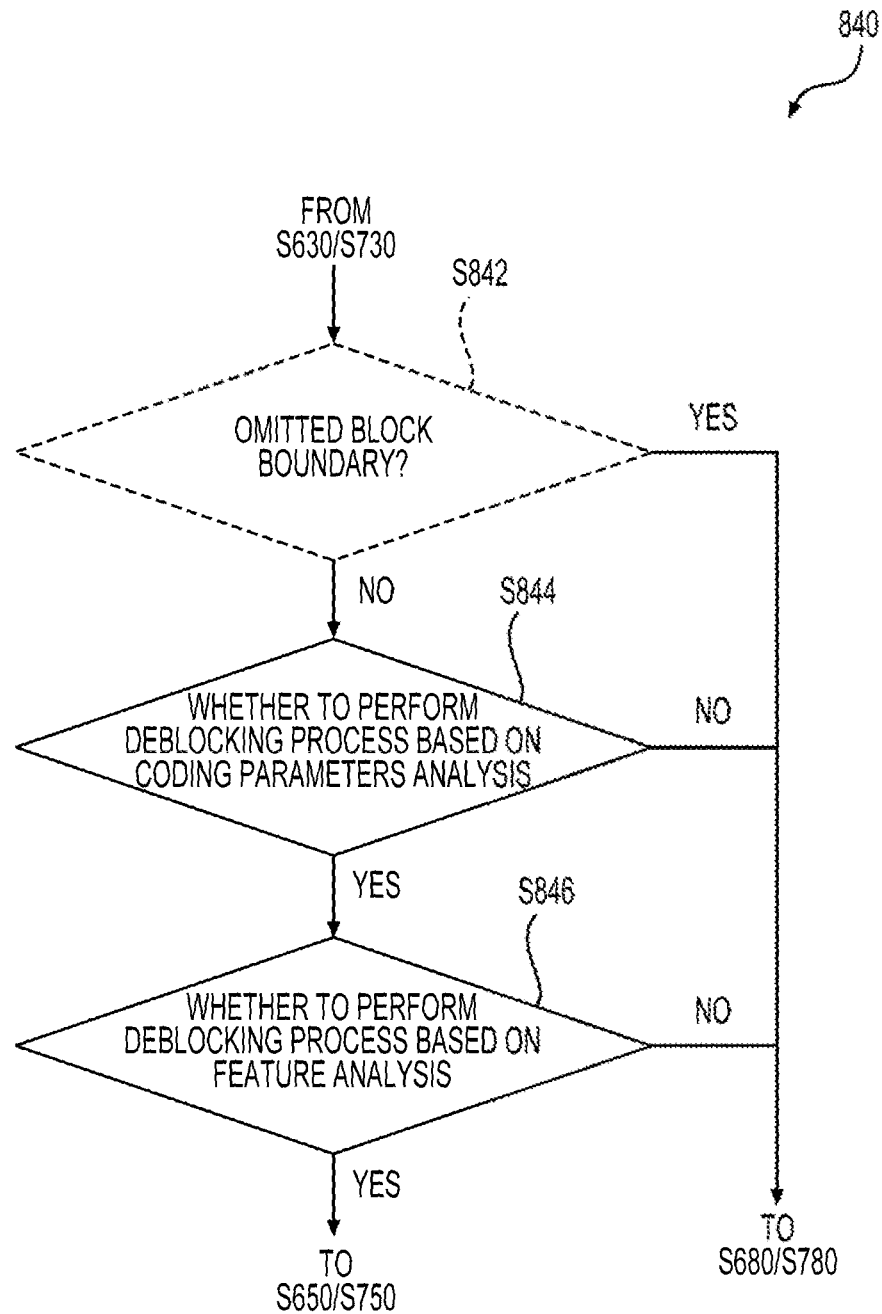
FIG. 8 shows a flow chart outlining an exemplary process for determining whether to perform a deblocking process on pixels adjacent to a particular block boundary according to an embodiment of the disclosure.

FIG. 8 shows a flow chart outlining an exemplary process 840 for determining whether to perform a deblocking process pixels adjacent to a particular block boundary according to an embodiment of the disclosure. The process 840 may correspond to S640 in FIG. 6 and/or S740 in FIG. 7. It is understood that additional operations may be performed before, during, and/or after the process 840 depicted in FIG. 8. After S630 or S730, the process proceeds to S842.

At S842, it is determined whether the deblocking process on the pixels adjacent to the current block boundary may be skipped for a reason in accordance with a predetermined standard. In some examples, if a block has two block boundaries extending along a first direction and has a block size along a second direction that is not greater than the reference number N, the deblocking process for one of the corresponding block boundaries may be skipped. If it is determined that the deblocking process on the pixels adjacent to the current block boundary should be skipped, the process proceeds to S680 or S780. Otherwise, the process proceeds to S844. In some examples, S842 may be omitted, and the process proceeds to S844 from S630 or S730.

At S844, it is determined whether the deblocking process is to be performed on the pixels adjacent to a current block boundary based on coding parameters of a first and second blocks that define the current block boundary. After analyzing the coding parameters, if it is determined that the deblocking process may be performed, the process proceeds to S846. Otherwise, if it is determined that the deblocking process can be skipped, the process proceeds to S680 or S780. For example, the deblocking module 114 or 124 can determine whether to perform a deblocking process on the pixels adjacent to the block boundary 230 by analyzing coding parameters for the blocks 210 and 220 as illustrated with reference to FIG. 2.

At S846, it is determined whether the deblocking process is to be performed on the pixels adjacent to a current block boundary based on a feature analysis of the pixels. After analyzing the pixels adjacent to the current block boundary, it is determined whether the block boundary corresponds to an image feature or a smooth portion of the image frame that is likely to be affected by blocking artifacts. If it is determined that the deblocking process is to be performed, the process proceeds to S650 or S750. Otherwise, if it is determined that the block boundary corresponds to a feature in the image frame and thus deblocking process can be skipped, the process proceeds to S680 or S780. For example, the deblocking module 114 or 124 can determine whether to perform a deblocking process on the pixels adjacent to the block boundary 230 by analyzing the pixels adjacent to the block boundary 230 as illustrated with reference to FIG. 2.

Figure 9A:
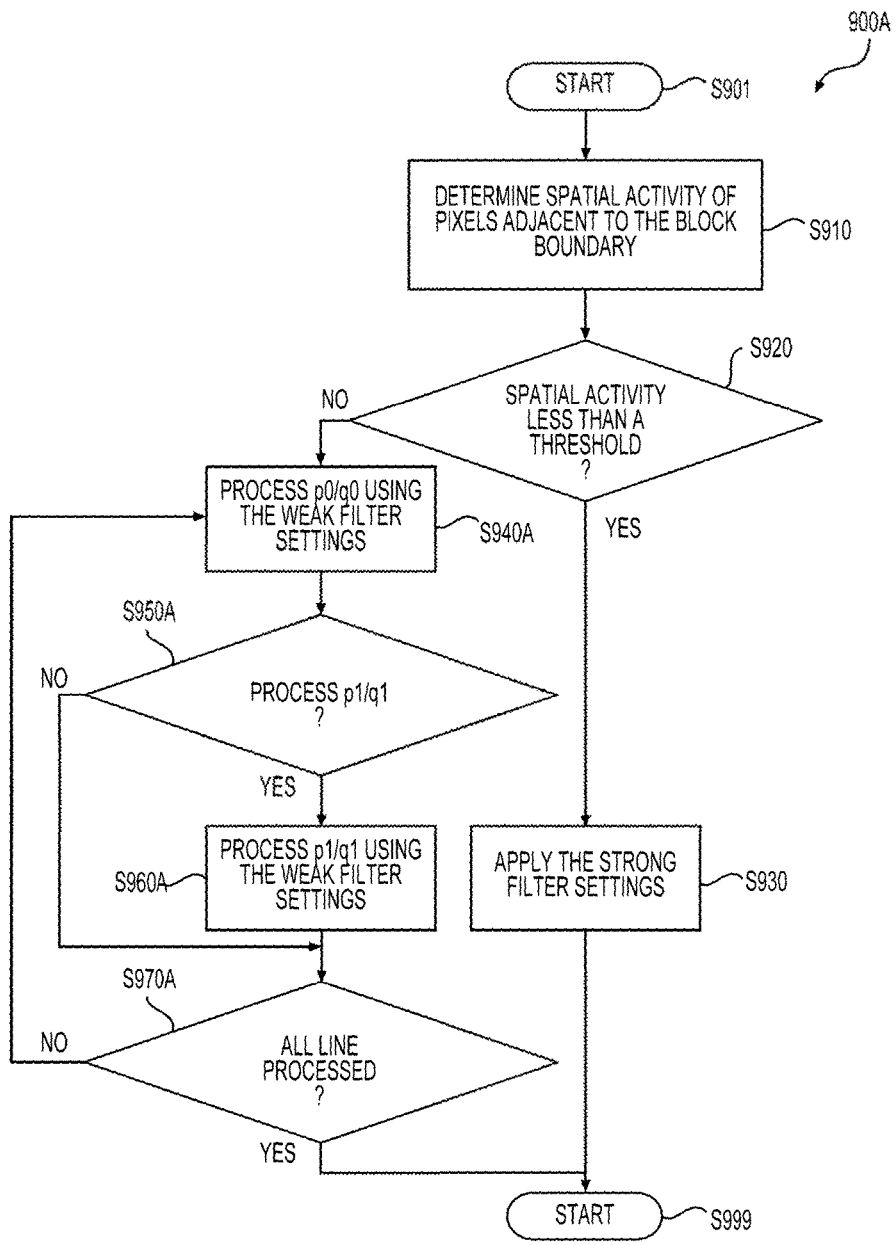
FIG. 9A shows a flow chart outlining an exemplary process for performing a deblocking process according to an embodiment of the disclosure.

FIG. 9A shows a flow chart outlining an exemplary process 900A for performing a deblocking process according to an embodiment of the disclosure. The process 900A may be performed by a deblocking module, such as the deblocking module 114 or 124 in FIG. 1, the deblocking module 414 in FIG. 4, or the deblocking module 524 in FIG. 5. In some examples, the process 900A may be used to implement S660 or S670 in FIG. 6 or S760 or S770 in FIG. 7, where the selected set of filter settings include strong filter settings and weak filter settings. It is understood that additional operations may be performed before, during, and/or after the process 900A depicted in FIG. 9A. The process 900A starts at S901 and proceeds to S910.

At S910, it is determined whether a first value representing first spatial activity is determined. For example, the deblocking module 114, 124, 414, or 524 may determine the first spatial activity as illustrated with reference to FIG. 2.

At S920, it is determined whether the first value representing the first spatial activity is less than a first threshold. If the first value representing the first spatial activity is less than the first threshold, the process proceeds to S930. Otherwise, the process proceeds to S940. At S930, because the pixels adjacent to the current block boundary is determined to be more likely in a flatter region and thus the stronger filter settings of a selected set of filter settings may be applied. For example, the deblocking module 114, 124, 414, or 524 may determine whether to apply the strong filter settings as illustrated with reference to FIG. 2.

The weak filter settings may be applied in a line-by-line basis. At S940A, for each line of pixels, the pixel p0 of a first block and the pixel q0 of a second block that are immediately adjacent to the block boundary defined by the first and second blocks are processed using the weak filter settings. For examples, the pixels p00 and q00 for the line of pixels that includes p00-p03 and q00-q03 in FIG. 2 or FIG. 3 may be processed using the weak filter settings; the pixels p10 and q10 for the line of pixels that includes p10-p13 and q10-q13 may be processed using the weak filter settings; the pixels p20 and q20 for the line of pixels that includes p20-p23 and q20-q23 may be processed using the weak filter settings; and the pixels p30 and q30 for the line of pixels that includes p30-p33 and q30-q33 may be processed using the weak filter settings.

At S950A, it is further determined whether to apply the weak filter settings to the pixel p1 of the first block and the pixel q1 of the second block that are next to the pixels p0 and q0, respectively. A second value representing to second spatial activity corresponding to the line of pixels may be determined. If the second value is less than a second threshold, the deblocking process for the pixels p1 and q2 may be skipped and the process proceeds to S970A. Otherwise, the process proceeds to S960A.

At S960A, the pixels p1 and q1 are processed based on the weak filter settings. For examples, the pixels p01 and q01 for the line of pixels that includes p00-p03 and q00-q03 in FIG. 2 or FIG. 3 may be processed using the weak filter settings; the pixels p11 and q11 for the line of pixels that includes p10-p13 and q10-q13 may be processed using the weak filter settings; the pixels p21 and q21 for the line of pixels that includes p20-p23 and q20-q23 may be processed using the weak filter settings; and the pixels p31 and q31 for the line of pixels that includes p30-p33 and q30-q33 may be processed using the weak filter settings.

At S970A, if all lines of pixels corresponding to the current block boundary are processed, the process proceeds to S999. Otherwise, the process proceeds to S940A to process a next line of pixels.

After S970A or S930, the process proceeds to S999 and terminates.

Figure 9B:
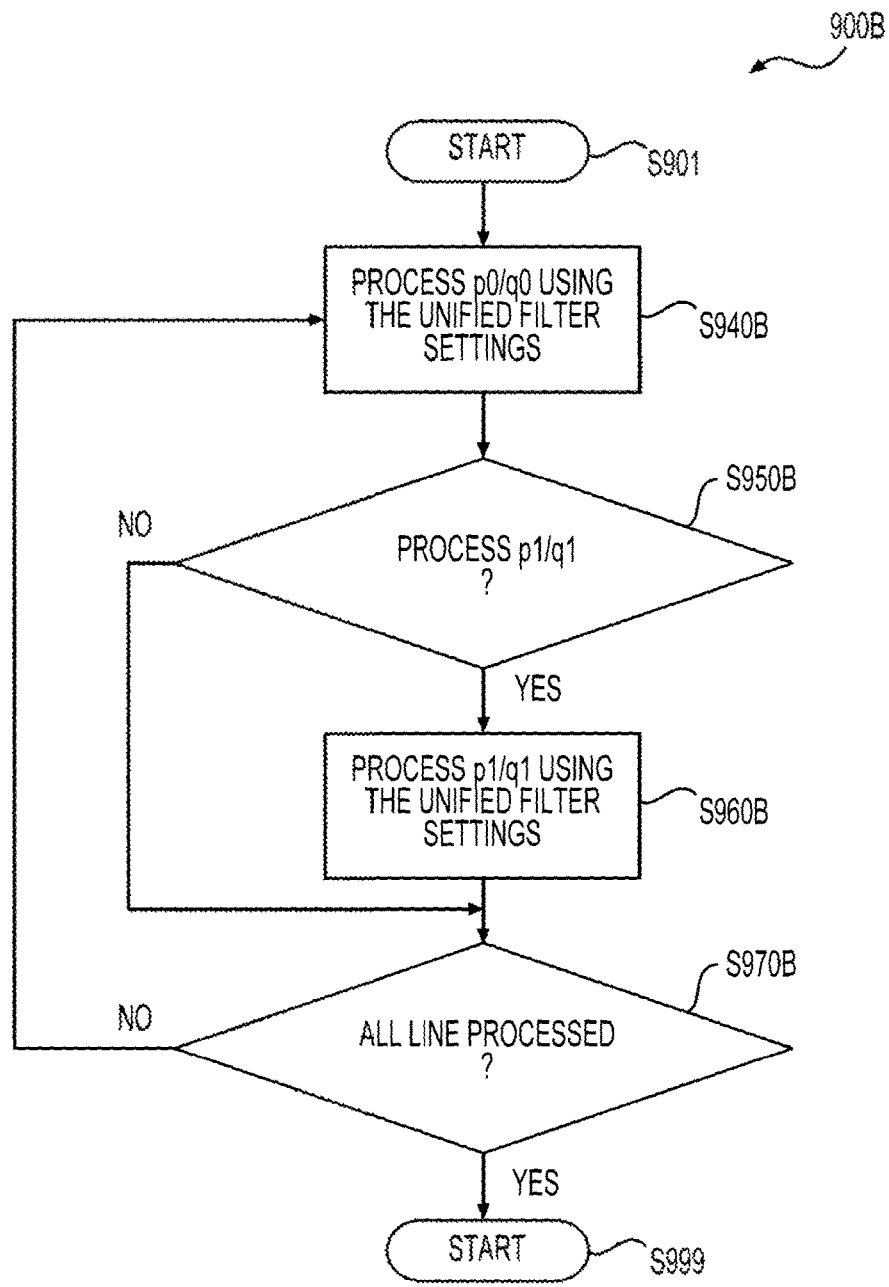
FIG. 9B shows a flow chart outlining another exemplary process for performing a deblocking process according to an embodiment of the disclosure.

FIG. 9B shows a flow chart outlining another exemplary process 900B for performing a deblocking process according to an embodiment of the disclosure. The process 900B may be performed by a deblocking module, such as the deblocking module 114 or 124 in FIG. 1, the deblocking module 414 in FIG. 4, or the deblocking module 524 in FIG. 5. In some examples, the process 900B may be used to implement S660 or S670 in FIG. 6 or S760 or S770 in FIG. 7, where the selected set of filter settings include unified filter settings. It is understood that additional operations may be performed before, during, and/or after the process 900B depicted in FIG. 9B. The unified filter settings may be applied in a line-by-line basis in a manner similar to applying the weak filter settings in S940A-S970A. The process 900B starts at S901 and proceeds to S940B.

At S940B, for each line of pixels, the pixel p0 of a first block and the pixel q0 of a second block that are immediately adjacent to the block boundary defined by the first and second blocks are processed using the unified filter settings. For examples, the pixels p00 and q00 for the line of pixels that includes p00-p03 and q00-q03 in FIG. 2 or FIG. 3 may be processed using the unified filter settings; the pixels p10 and q10 for the line of pixels that includes p10 -p13 and q10-q13 may be processed using the unified filter settings; the pixels p20 and q20 for the line of pixels that includes p20-p23 and q20-q23 may be processed using the unified filter settings; and the pixels p30 and q30 for the line of pixels that includes p30-p33 and q30-q33 may be processed using the unified filter settings.

At S950B, it is further determined whether to apply the unified filter settings to the pixel p1 of the first block and the pixel q1 of the second block that are next to the pixels p0 and q0, respectively. A value representing to spatial activity corresponding to the line of pixels may be determined. If the second value is less than a second threshold, the deblocking process for the pixels p and q2 may be skipped and the process proceeds to S970B. Otherwise, the process proceeds to S960B.

At S960B, the pixels p1 and q1 are processed based on the unified filter settings. For examples, the pixels p01 and q01 for the line of pixels that includes p00-p03 and q00-q03 in FIG. 2 or FIG. 3 may be processed using the unified filter settings; the pixels p11 and q11 for the line of pixels that includes p10-p13 and q10-q13 may be processed using the unified filter settings; the pixels p21 and q21 for the line of pixels that includes p20-p23 and q20-q23 may be processed using the unified filter settings; and the pixels p31 and q31 for the line of pixels that includes p30-p33 and q30-q33 may be processed using the unified filter settings.

At S970B, if all lines of pixels corresponding to the current block boundary are processed, the process proceeds to S999. Otherwise, the process proceeds to S940B to process a next line of pixels.

After S970B, the process proceeds to S999 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of video coding, comprising:
  receiving input data associated with a first block and a second block of an image frame, the first block and the second block defining a block boundary therebetween, the block boundary extending along a first direction, the first block having a first block size along a second direction different from the first direction, and the second block having a second block size along the second direction;

identifying a reference size along the second direction for coding the image frame;

determining, by a processing circuit of a video coding apparatus, whether to perform a deblocking process on pixels adjacent to the block boundary; and performing, by the processing circuit of the video coding apparatus, the deblocking process if it is determined that the deblocking process is to be performed, including processing the pixels adjacent to the block boundary using a first set of deblocking filter settings if the first block size and the second block size are greater than the reference size, the first set of deblocking filter settings using at most a first number of pixels on each side of the block boundary; and processing the pixels adjacent to the block boundary using a second set of deblocking filter settings if the first block size or the second block size is not greater than the reference size, the second set of deblocking filter settings using at most a second number of pixels on each side of the block boundary, and the second number being less than the first number, wherein the reference size is N pixels, N being a positive integer, the second number is equal to or less than N/2, when the second set of deblocking filter settings includes weak filter settings and strong filter settings, the processing the pixels if the first block size or the second block size is not greater the reference size comprises:

applying the strong filter settings if a first value representing first spatial activity corresponding to the pixels adjacent to the block boundary is less than a first threshold; and applying the weak filter settings if the first value representing the first spatial activity corresponding to the pixels adjacent to the block boundary is equal to or greater than the first threshold, and when the second set of deblocking filters includes unified filter settings that uses at most N/2 pixels on each side of the block boundary, the processing the pixels if the first block size or the second block size is not greater the reference size comprises:

applying the unified filter settings.

2. The method of video coding according to claim 1, wherein the applying the weak filter settings is performed in a line-by-line basis and comprises:

determining a second value representing second spatial activity corresponding to a line of pixels along the second direction;

processing a first pixel of the first block in the line that is adjacent to the block boundary using the weak filter settings;

processing a second pixel of the first block in the line that is next to the first pixel using the weak filter settings if the second value representing the second spatial activity is less than a second threshold; and skipping processing the second pixel of the first block if the second value representing the second spatial activity is equal to or greater than the second threshold.

3. The method of video coding according to claim 1, wherein the weak filter settings of the second set of deblocking filters uses at most N/2 pixels on each side of the block boundary, and the strong filter settings of the second set of deblocking filters uses at most N/2 pixels on each side of the block boundary.

4. The method of video coding according to claim 1, wherein a line of pixels along the second direction includes two pixels, p0 and p1, of the first block and two pixels, q0 and q1, of the second block, p0 and q0 are adjacent to the block boundary, p1 is next to p0, q1 is next to q0, the weak filter settings include generating a new value p0' to replace p0 according to $p0'=(3*p1+7*p0+9*q0-3*q1+8)>>4$, and the strong filter settings include generating a new value p0' to replace p0 according to $p0'=(p1+2*p0+2*q0-q1+2)>>2$.

5. The method of video coding according to claim 1, wherein the weak filter settings of the second set of deblocking filters uses at most N/4 sample on each side of the block boundary, and the strong filter settings of the second set of deblocking filters uses at most N/2 pixels on each side of the block boundary.

6. The method of video coding according to claim 1, wherein the applying the unified filter settings is performed in a line-by-line basis and comprises:

determining a second value representing second spatial activity corresponding to a line of pixels along the second direction;

processing a first pixel of the first block in the line that is adjacent to the block boundary using the unified filter settings;

processing a second pixel of the first block in the line that is next to the first pixel using the unified filter settings if the second value representing the second spatial activity is less than a second threshold; and skipping processing the second pixel of the first block if the second value representing the second spatial activity is equal to or greater than the second threshold.

7. The method of video coding according to claim 1, wherein the reference size along the second direction for coding the image frame corresponds to a minimum block size along the second direction.

8. The method of video coding according to claim 1, wherein the input data include encoded video data of the image frame, and the method further comprises extracting the reference size from the encoded video data.

9. The method of video coding according to claim 1, further comprising:

generating encoded video data of the image frame, and including in the encoded video data information regarding the reference size.

10. A video coding apparatus, comprising:

a processing circuit configured to:

receive input data associated with a first block and a second block of an image frame, the first block and the second block defining a block boundary therebetween, the block boundary extending along a first direction, the first block having a first block size along a second direction different from the first direction, and the second block having a second block size along the second direction;

identify a reference size along the second direction for coding the image frame;

determine whether to perform a deblocking process on pixels adjacent to the block boundary; and perform the deblocking process if it is determined that the deblocking process is to be performed, including processing the pixels adjacent to the block boundary using a first set of deblocking filter settings if the first block size and the second block size are greater than the reference size, the first set of deblocking filter settings using at most a first number of pixels on each side of the block boundary; and processing the pixels adjacent to the block boundary using a second set of deblocking filter settings if the first block size or the second block size is not greater than the reference size, the second set of deblocking filter settings using at most a second number of pixels on each side of the block boundary, and the second number being less than the first number, wherein the reference size is N pixels, N being a positive integer, the second number is equal to or less than N/2, the processing circuit is further configured to, when the second set of deblocking filter settings includes weak filter settings and strong filter settings, and the first block size or the second block size is not greater the reference size, apply the strong filter settings if a first value representing first spatial activity corresponding to the block boundary is less than a first threshold, and apply the weak filter settings if the first value representing the first spatial activity corresponding to the block boundary is equal to or greater than the first threshold, and the processing circuit is further configured to, when the second set of deblocking filter settings includes unified filter settings that uses at most N/2 pixels on each side of the block boundary, and the first block size or the second block size is not greater the reference size, apply the unified filter settings.

11. The video coding apparatus according to claim 10, wherein the processing circuit is configured to apply the weak filter settings in a line-by-line basis by determining a second value representing second spatial activity corresponding to a line of pixels along the second direction;

processing a first pixel of the first block in the line that is adjacent to the block boundary using the weak filter settings;

processing a second pixel of the first block in the line that is next to the first pixel using the weak filter settings if the second value representing the second spatial activity is less than a second threshold; and skipping processing the second pixel of the first block if the second value representing the second spatial activity is equal to or greater than the second threshold.

12. The video coding apparatus according to claim 10, wherein the processing circuit is configured to apply the unified filter settings in a line-by-line basis by determining a second value representing second spatial activity corresponding to a line of pixels along the second direction;

processing a first pixel of the first block in the line that is adjacent to the block boundary using the unified filter settings;

processing a second pixel of the first block in the line that is next to the first pixel using the unified filter settings if the second value representing the second spatial activity is less than a second threshold; and skipping processing the second pixel of the first block if the second value representing the second spatial activity is equal to or greater than the second threshold.

13. A non-transitory computer readable medium storing program instructions for causing a processing circuit of an apparatus to perform a video coding method, and the method comprising:

receiving input data associated with a first block and a second block of an image frame, the first block and the second block defining a block boundary therebetween, the block boundary extending along a first direction, the first block having a first block size along a second direction different from the first direction, and the second block having a second block size along the second direction;

identifying a reference size along the second direction for coding the image frame;

determining whether to perform a deblocking process on pixels adjacent to the block boundary; and performing the deblocking process if it is determined that the deblocking process is to be performed, including processing the pixels adjacent to the block boundary using a first set of deblocking filter settings if the first block size and the second block size are greater than the reference size, the first set of deblocking filter settings using at most a first number of pixels on each side of the block boundary; and processing the pixels adjacent to the block boundary using a second set of deblocking filter settings if the first block size or the second block size is not greater than the reference size, the second set of deblocking filter settings using at most a second number of pixels on each side of the block boundary, and the second number being less than the first number, wherein the reference size is N pixels, N being a positive integer, the second number is equal to or less than N/2, when the second set of deblocking filter settings includes weak filter settings and strong filter settings, the processing the pixels if the first block size or the second block size is not greater the reference size comprises:

applying the strong filter settings if a first value representing first spatial activity corresponding to the block boundary is less than a first threshold; and applying the weak filter settings if the first value representing the first spatial activity corresponding to the block boundary is equal to or greater than the first threshold, and when the second set of deblocking filters includes unified filter settings that uses at most N/2 pixels on each side of the block boundary, the processing the pixels if the first block size or the second block size is not greater the reference size comprises:

applying the unified filter settings.

14. The non-transitory computer readable medium according to claim 13, wherein the applying the weak filter settings is performed in a line-by-line basis and comprises:

determining a second value representing second spatial activity corresponding to a line of pixels along the second direction;

processing a first pixel of the first block in the line that is adjacent to the block boundary using the weak filter settings;

processing a second pixel of the first block in the line that is next to the first pixel using the weak filter settings if the second value representing the second spatial activity is less than a second threshold; and skipping processing the second pixel of the first block if the second value representing the second spatial activity is equal to or greater than the second threshold.

15. The non-transitory computer readable medium according to claim 13, wherein the applying the unified filter settings is performed in a line-by-line basis and comprises:

determining a second value representing second spatial activity corresponding to a line of pixels along the second direction;

processing a first pixel of the first block in the line that is adjacent to the block boundary using the unified filter settings;

processing a second pixel of the first block in the line that is next to the first pixel using the unified filter settings if the second value representing the second spatial activity is less than a second threshold; and skipping processing the second pixel of the first block if the second value representing the second spatial activity is equal to or greater than the second threshold.

* * * * *